(12) United States Patent
Robert et al.

(10) Patent No.: US 7,465,398 B1
(45) Date of Patent: Dec. 16, 2008

(54) METHOD FOR FILTERING AND RECOVERING SOLIDS FROM POTATO PROCESS WATER

(75) Inventors: Jeffrey P Robert, Williamsburg, VA (US); Walter Scott Roesener, Idaho Falls, ID (US)

(73) Assignee: Delta-T Corporation, Williamsburg, VA (US)

(*) Notice: Subject to any disclaimer, the term of this patent is extended or adjusted under 35 U.S.C. 154(b) by 717 days.

(21) Appl. No.: 11/004,386

(22) Filed: Dec. 3, 2004

Related U.S. Application Data

(63) Continuation-in-part of application No. 09/675,734, filed on Sep. 29, 2000, now abandoned.

(51) Int. Cl.
B01D 61/00 (2006.01)
A23L 1/28 (2006.01)
C08B 30/00 (2006.01)

(52) U.S. Cl. ............ 210/651; 210/650; 210/652; 210/195.2; 210/257.2; 210/641; 426/489; 127/65; 127/24

(58) Field of Classification Search ......... 210/650–652, 210/641, 638, 639, 195.2, 257.2; 426/489; 127/66–69, 24
See application file for complete search history.

(56) References Cited

U.S. PATENT DOCUMENTS

| | | | |
|---|---|---|---|
| 4,000,065 A | 12/1976 | Ladha et al. | |
| 4,083,779 A | 4/1978 | Combe et al. | |
| 4,131,541 A * | 12/1978 | de Putter | 210/636 |
| 4,251,895 A | 2/1981 | Caridis et al. | |
| 4,412,867 A | 11/1983 | Cicuttini | |
| RE31,982 E | 9/1985 | Beck et al. | |
| RE31,983 E | 9/1985 | Beck et al. | |
| 5,262,053 A * | 11/1993 | Meier | 210/636 |
| 5,374,356 A | 12/1994 | Miller et al. | |
| 5,501,798 A | 3/1996 | Al-Samadi et al. | |
| 5,549,830 A | 8/1996 | Carver et al. | |
| 5,573,795 A | 11/1996 | Olsen | |
| 5,578,213 A * | 11/1996 | Miller et al. | 210/641 |
| 5,593,598 A | 1/1997 | McGinness et al. | |

(Continued)

OTHER PUBLICATIONS

Been Huang Chiang et al., Ultrafiltration and Reverse Osmosis of the Waste Water from Sweet Potato Starch Process, Journal of Food Science, 1986, pp. 971-974, vol. 51, No. 4.

(Continued)

Primary Examiner—Ana M Fortuna
(74) Attorney, Agent, or Firm—Joy L. Bryant

(57) ABSTRACT

A method for filtering and recovering solids from potato process water that results in a product containing a portion of the solids from the potato process water is presented. In general, the method involves providing a plurality of vessels wherein a step in a manufacturing process takes place in each vessel and wherein at least one step in the manufacturing process produces a potato process water having solids. The potato process water is passed through at least one ultrafilter wherein each ultrafilter produces an ultrafilter (u/f) permeate stream and a u/f concentrate stream. The u/f concentrate stream is collected and reintroduced into at least one vessel in the manufacturing process producing a product containing a portion of the solids from the potato process water. The final characteristics of the product remain essentially unchanged.

19 Claims, 7 Drawing Sheets

U.S. PATENT DOCUMENTS

| | | | |
|---|---|---|---|
| 5,885,461 A | 3/1999 | Tetrault et al. | |
| 5,942,107 A * | 8/1999 | Busch, Jr. | 210/195.2 |
| 5,965,189 A | 10/1999 | Stevens et al. | |
| 5,997,652 A | 12/1999 | Potter et al. | |
| 6,036,854 A | 3/2000 | Potter | |
| 6,066,353 A | 5/2000 | Martines-Serna Villa | |
| 6,110,390 A | 8/2000 | Potter et al. | |
| 6,197,358 B1 | 3/2001 | Bunker | |
| 6,454,946 B1 | 9/2002 | Defrees | |
| 6,555,003 B2 | 4/2003 | Ferro et al. | |
| 6,648,978 B2 | 11/2003 | Liaw et al. | |
| 6,736,903 B2 | 5/2004 | Minazzoli | |
| 7,306,739 B1 * | 12/2007 | Camin et al. | 210/723 |
| 2003/0104117 A1 | 6/2003 | Villagran et al. | |
| 2005/0051470 A1 * | 3/2005 | Potter et al. | |

OTHER PUBLICATIONS

Electronic Copy of News Commentary on compact disc (undated).

\* cited by examiner

METHOD FOR FILTERING AND RECOVERING SOLIDS FROM POTATO PROCESS WATER

CROSS-REFERENCE TO RELATED APPLICATIONS

This application is a continuation-in-part of U.S. patent application Ser. No. 09/675,734, entitled, "Method and Apparatus for Potato Process Water Filtration and Solids Recovery," filed Sep. 29, 2000 abandoned.

FIELD OF THE INVENTION

The present invention is related to methods for filtering and recovering solids from potato process water. In particular, it is related to a method which produces a product containing a portion of the solids from the process water.

BACKGROUND OF THE INVENTION

In recent years, treating the wastewater from potato processing facilities has become a serious environmental concern, as well as a large expense. These facilities process "raw" harvested potatoes into consumer products such as french fries, criss-cut fries, wedges, hash browns, granules, flakes, slices, and other various frozen and dehydrated products. Water is integral to the process and often contains solid potato pieces that are considered to be waste products. Therefore, it is desirable to have a process that would utilize such waste products in the final product and minimize the amount of waste at the end of the process that needs to be treated.

U.S. Pat. No. 5,997,652 to Potter et al. describes a food starch processing method and apparatus. The apparatus, a food starch separator, comprises a serially connected centrifuge and a membrane separator further comprising a sintered pipe providing pore flow paths including a pumped source of food plant liquor, outputs for the centrifuge and membrane separator and a control system to regulate the flow of the food plant liquor. In a modified batch operation with feedback, flow is directed through a first centrifuge, a second centrifuge and then through a membrane separator. The flow is then delivered out of the membrane separator and directed to a feedback line that returns the concentrate from the membrane separator to a tank that is refilled with the feedback flow. As this process occurs, some portion of the solvent is recovered and some portion of the starch and pulp material is segregated and removed. The batch can be terminated by obtaining specified concentrate strength. Potter et al. fail to disclose a manufacturing process that produces a product containing a portion of the solids from the process water and wherein the final characteristics of the product remain essentially unchanged.

U.S. Pat. No. 6,736,903 to Minazzoli describes a method and apparatus for producing a work product. In practicing this method, a first fluid composed of a liquid, a target substance and at least one residual substance is received. The first fluid is passed through a means for separating the residual substance from the first fluid to produce a secondary fluid substantially composed of the liquid and the target substance. The secondary fluid is treated to reduce the proportion of the liquid relative to the target substance in the secondary fluid to form the work product. Minazzoli discloses that the resultant product may be converted for reuse; have a useful purpose in its own right; be of independent commercial use and value; or useful for a wide variety of purposes and different applications. However, Minazzoli fails to disclose that the product produced from the manufacturing process contains a portion of the solids from the process water and that the final characteristics of the product remain essentially unchanged.

U.S. Pat. No. 5,593,598 to McGinness et al. discloses a method and apparatus for closed loop recycling of contaminated cleaning solution. In particular, they describe a method wherein the rinse water from the cleaning process is separated by reverse osmosis into a reconcentrated reusable cleaning solution and clean reusable recyclable rinse water. The reconcentrated reusable cleaning solution is then returned back to the original cleaning process and the cleaning solution station, and the reverse osmosis product water is returned to the original rinse station for reuse. However, this process focuses on the separation of a liquid cleaning solution from the rinse water. Moreover, in this closed loop process, the cleaning solution is continuously reconcentrated from the rinse water and the cleaning solution is returned back to the original cleaning process for reuse and the rinse water is returned to the rinse station. The present invention is an open loop process where a final product is derived from the process such that it contains a portion of the solids from the original process water and wherein the final characteristics of the product remain essentially unchanged.

Liaw et al. in U.S. Pat. No. 6,658,978 describe a membrane filtration process for thickening and starch washing in corn wet milling. The process comprises the steps of (1) separating wet milled de-germed corn particles into a fiber component and a first stream comprising water, starch, and protein (e.g. fiber separation step); (2) performing membrane filtration of the first stream (e.g. starch-protein stream thickening) producing a first retentate and a first aqueous permeate; (3) and separating the first retentate (e.g. thickened starch-protein stream) into a second stream and a third stream (e.g. primary starch separation step), wherein the second stream comprises water and a majority of the starch present in the first retentate, and the third stream comprises water and a majority of the protein present in the first retentate. The second stream comprises more than half of the starch that was present in the first retentate (thickened starch-protein stream). Liaw et al. fail to disclose a step in the process where the second stream is reintroduced into at least one vessel in the manufacturing process such that the resulting product from the process contains a portion of the solids from the process water and the final characteristics of the product remain essentially unchanged.

U.S. Pat. No. 5,374,356 to Miller et al. describes a fluid treatment process using dynamic microfiltration and ultrafiltration. In this process, wastewater is treated by passing wastewater into a dynamic microfiltration assembly to form a first concentrate stream and a filtrate stream and then passing the filtrate stream into an ultrafiltration assembly to form a second concentrate stream and a purified water stream. The purified water stream can then be further treated, recycled, and/or discharged as appropriate. The first and second concentrate stream can be further processed or held for proper disposal. Miller et al. fail to disclose the reincorporation of the second concentrate stream into the process to produce a product containing a portion of the solids from the process water. In fact, based on the teaching of Miller et al., it would be undesirable to do so because their process is directed toward wastewater treatment.

U.S. Pat. No. 4,412,867 to Cicuttini describes a wet milling process for starch bearing materials (e.g. corn, potatoes or wheat) wherein water being used in the process is separated by reverse osmosis or ultrafiltration. One fraction (the first fraction) has a lower content of soluble and insoluble matter than the other (second) fraction. The first fraction is then recycled to the washing step in the milling process where it is used to wash the starch. The separation and recycling steps reduce the water requirement of the milling process and also reduce the volume of effluent leaving the process, which needs to be evaporated and/or disposed of. As in Miller et al., Cicuttini fails to disclose a method whereby the second fraction is incorporated into the final product, producing a product containing a portion of the solids from the process water.

An object of the present invention is to provide a method for filtering and recovering solids from potato process water and reintroducing those solids back into the process such that the resulting product contains a portion of the solids from the potato process water.

SUMMARY OF THE INVENTION

By the present invention, a method for filtering and recovering solids from potato process water that results in a product containing a portion of the solids from the potato process water is presented. In general, the method involves providing a plurality of vessels wherein a step in a manufacturing process takes place in each vessel and wherein at least one step in the manufacturing process produces a potato process water having solids. The potato process water is passed through at least one ultrafilter wherein each ultrafilter (u/f) produces a u/f permeate stream and a u/f concentrate stream. The u/f concentrate stream is collected and reintroduced into at least one vessel in the manufacturing process producing a product containing a portion of the solids from the potato process water. The final characteristics of the product remain essentially unchanged.

The present invention offers a substantial advantage over the methods employed by the prior art in that the return of potato solids, which were previously discarded, to the ricing and drying process results in an overall increase in the product yield without essentially changing the final characteristics of the product.

Additional objects and advantages of the invention will be set forth in part in the description which follows, and in part, will be obvious from the description, or may be learned by practice of the invention. The objects and advantages of the invention will be obtained by means of instrumentalities in combinations particularly pointed out in the appended claims.

BRIEF DESCRIPTION OF THE DRAWINGS

The accompanying drawings illustrate a complete embodiment of the invention according to the best modes so far devised for the practical application of the principals thereof, and in which.

DETAILED DESCRIPTION OF THE PREFERRED EMBODIMENTS

Numerous methods are employed for processing potatoes from raw potatoes into final potato products. The methods are often categorized by the end product: dehydrated, frozen, and refrigerated. The dehydrated products include flakes, granules, and slices/dices. Most of these methods, including dehydrated methods, use water and/or steam during their respective processes and are referred to as "wet processes."

The method of the present invention is used to reincorporate the concentrated solids from any wet potato process into the final potato product. Any wet process known to one of ordinary skill in the art may be used in the present invention. Preferably, the method of the present invention is adopted for a dehydrated flake process. In such a process, any commercially-available potato can be used to make dehydrated flakes. Preferably, the flakes are prepared from potatoes such as but not limited to Kennebec, Russet Burbank, Idaho Russet, Sebago, Bentgie, Aurora, Saturna, and Mentor. Raw or preconditioned potato pieces, slices, nubbins, slivers, or mixtures thereof can be used in the present invention.

Figure 1:
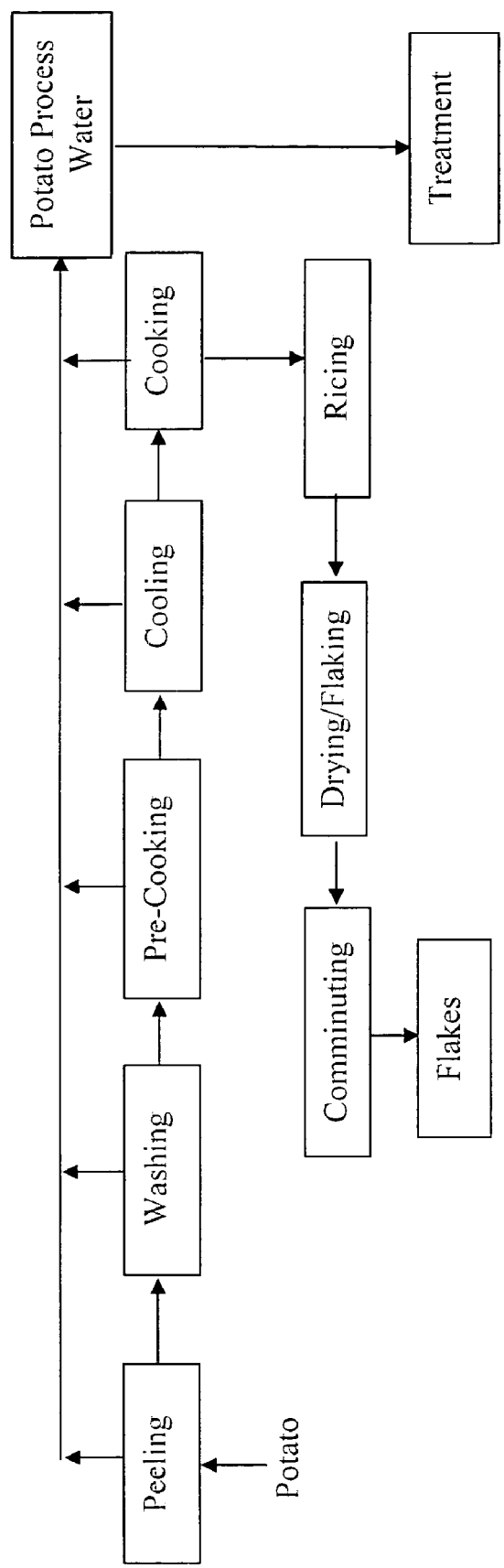
FIG. 1 is a general schematic representation of a potato process.

Referring now to FIG. 1, a general schematic of the potato manufacturing process is presented. The method of the present invention is practiced in conjunction with a potato manufacturing process. A plurality of vessels are provided wherein a step in the manufacturing process takes place in each vessel. At least one step in the manufacturing process produces a process water having solids. For example, in the peeling process, raw potatoes are peeled by any suitable method which removes the peels without damaging the remainder of the potato. The peeled potatoes are then sliced into pieces or "slabs" with a thickness of from about 0.10 to about 1.00 inches. The condensate from the peeling operation forms a process water stream having solids contained therein.

The raw potato pieces/slabs are optionally washed by any suitable process known in the art, such as those which remove the remainder of the peels. The condensate from this optional washing operation is also a process water stream containing solids.

The potatoes are precooked by any process known to one of ordinary skill in the art. In general, the precook operation is used to gelatinize and gently swell the starches within the potato. The precooker generates an overflow containing suspended and dissolved solids. Any precooking operation which accomplishes this function is suitable for use in the present invention. Both the overflow and condensate from the precook operation are process water streams having solids.

During a cooling step, the potato temperature is lowered from about 160° F. to about 75° F. Typically, the cooling stage uses water to reduce the temperature of the potatoes prior to the cooking operation where the cooking is completed. The overflow from the cooling operation is a process water stream having solids.

Raw potato pieces/slabs are cooked by any suitable method known in the art. In one method, the pieces/slabs are cooked for a length of time at a particular temperature and pressure sufficient to evenly and fully cook the pieces/slabs. Alternatively, the potato pieces/slabs are cooked using a pressurized vessel or superheated steam, allowing for the temperatures and pressures to be varied depending on the equipment used. The condensate from this manufacturing step is a process water stream having solids.

The potato pieces/slabs are riced by any ricing method known to those of ordinary skill in the art. During the ricing stage, potato pieces are forced through a slotted or perforated plate without breaking the cell structure of the potato to form a wet mash. Optionally, an emulsifier is added to the wet mash or cooked potatoes as a processing aid before, during or after the ricing stage. When it is desired to improve storage stability of the dehydrated flakes, stabilizers and preservatives are added to the wet mash. A process water stream containing solids is also produced from ricing.

After a potato is riced, the potato mash is subjected to drying and flaking processes. The potato mash is subjected to processes that dry the potato mash into the desired flakes in either separate stages or in the same stage. Various dryers may be employed to accomplish this such as fluidized bed dryers, scraped wall heat exchangers, drum dryers, and the like. Preferably, a drum dryer is used. A process water stream containing solids is produced from the drying process when the water is driven off as a condensate.

When the drying and flaking operation is completed, a dried sheet results. This dried sheet is subject to a comminuting process. It is important that the starch damage is minimized during the comminution process. Acceptable methods of comminution include but are not limited to grinding, cutting, and pulverizing. When comminution is completed, the potato flakes are packaged and shipped.

The various steps in the manufacturing process include the peeling, washing, pre-cooking, cooling, cooking, ricing and drying steps. Of these steps in the manufacturing process, the peeling, washing, pre-cooking, cooling and cooking steps all produce process water having solids. The process water may contain anywhere from about 01% by weight to about 5% by weight potato solids.

Figure 2:
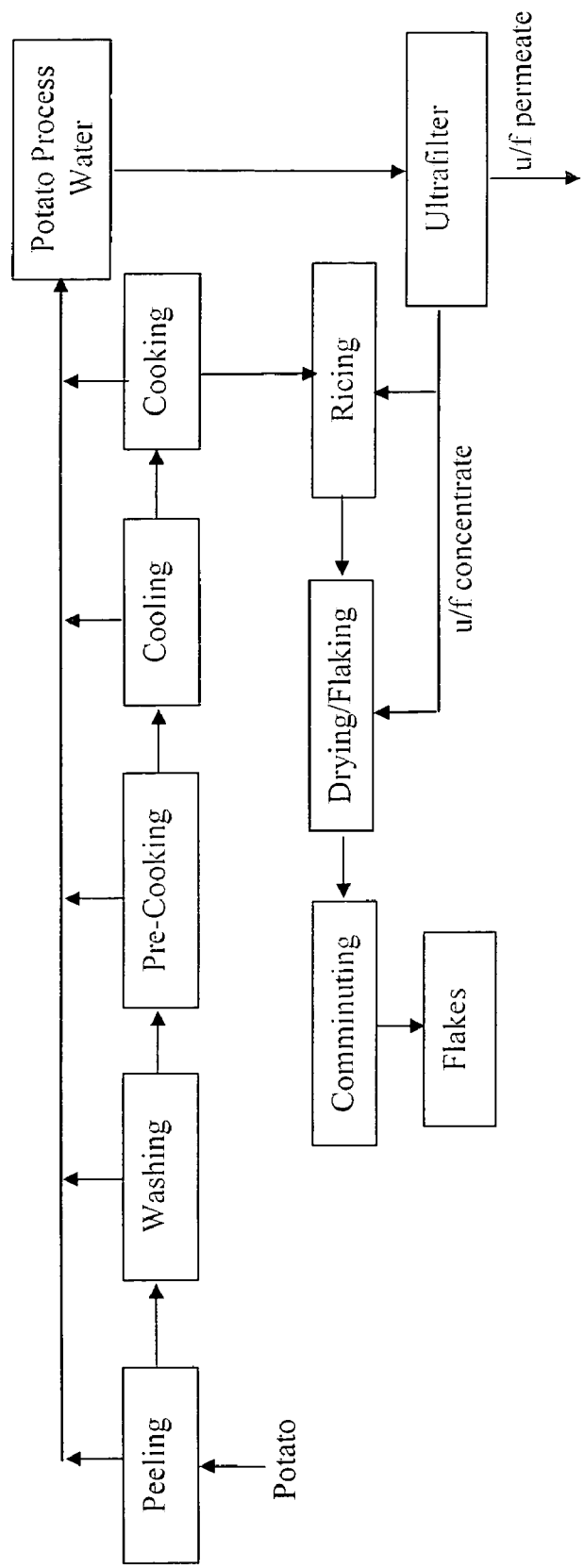
FIG. 2 is a schematic representation of the method of the present invention wherein concentrates from a single ultrafilter are reintroduced into the potato process.

FIG. 2 depicts the method of the present invention in its simplest embodiment where only a single ultrafilter is provided. In practicing the method of the present invention, the process water from at least one of the various steps in the manufacturing process is passed through at least one ultrafilter. Any ultrafilter known to those of ordinary skill in the art may be employed. Inorganic filters including metal and metal alloys like stainless steel, ceramics, and combinations of metals and ceramics are suitable. Preferably, the ultrafilter is a ceramic membrane supported on sintered stainless steel. Most preferably, the ultrafilter is the Scepter™ Stainless Steel/Ceramic Ultrafilter which is commercially available from Graver Technologies in Delaware.

Potato process water having solids is derived from at least one step in the manufacturing process. Such a step includes but is not limited to: peeling; washing; pre-cooking; cooling and cooking. Alternatively, the potato process water is produced by more than one of the aforementioned steps. The potato process water having solids is passed through an ultrafilter, producing an ultrafilter (u/f) permeate stream and a u/f concentrate stream. In contrast to prior art methods, the method of the present invention seeks to utilize the u/f concentrate stream. Other prior art methods treat the u/f concentrate stream as waste water and fail to reintroduce the u/f concentrate stream back into the manufacturing process. When practicing the method of the present invention, the u/f concentrate stream is collected and reintroduced into at least one vessel in the manufacturing process, preferably the ricing or drying vessel. Hence, the product produced contains a portion of the solids from the process water without essentially changing the product characteristics.

A desirable aspect of the present invention is to recover the potato solids that are typically treated as waste material and to reintroduce the solids back into the manufacturing process. This recovery process involves passing the potato process water through at least one ultrafilter to produce a concentrate stream high in potato solids (about 5 to about 25 wt % solids) while also producing a permeate stream that contains a low concentration of potato solids (less than about 0.1 wt %). The process is substantially continuous, meaning that greater than about 80%, preferably greater than about 90%, of the steady-state production rate of the permeate (permeate flux) can be maintained for at least about 24 hours (preferably for more than about 7 days) before and between cleanings.

Figure 3:
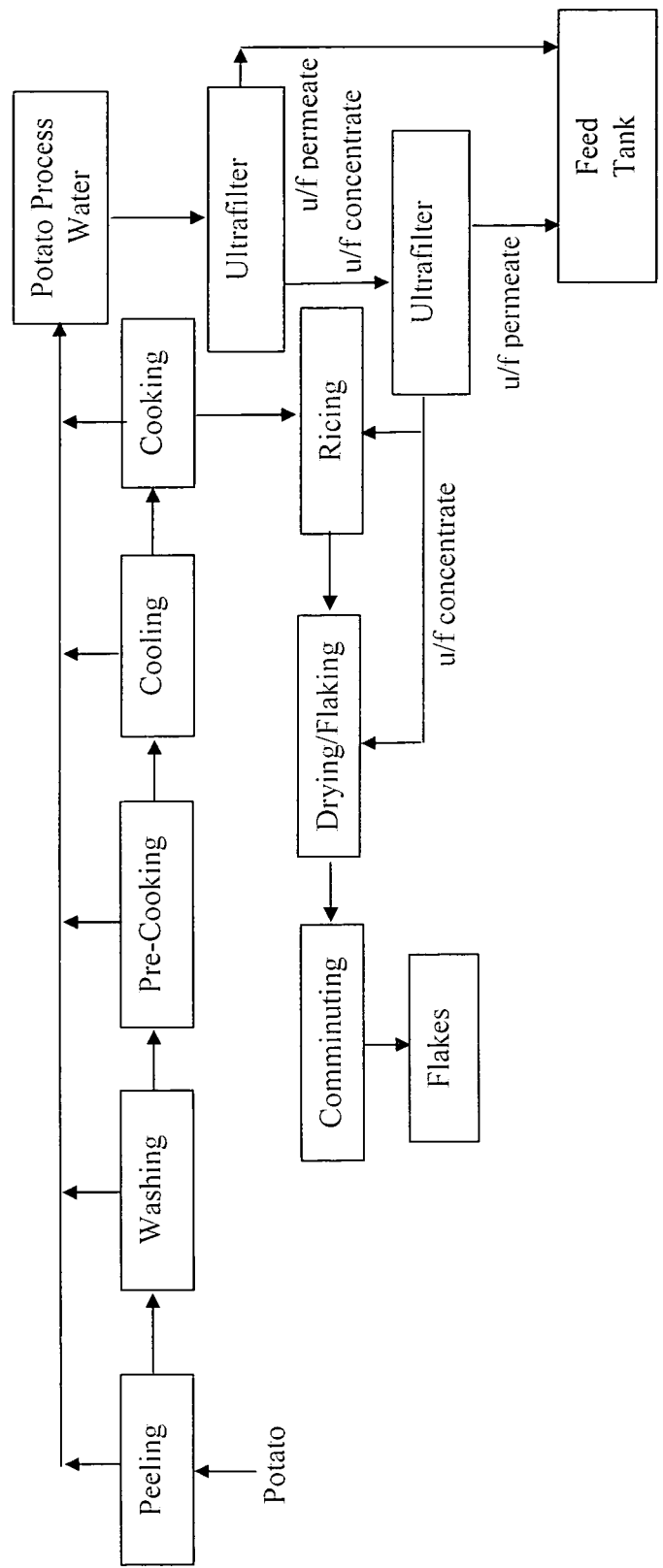
FIG. 3 is a schematic representation of the method of the present invention wherein a series of ultrafilters are employed.

FIG. 3 depicts an embodiment of the invention that employs a series of ultrafilters to successively remove smaller potato solids. In this embodiment, a plurality of ultrafilters are staged in series with respect to one another. The process water having solids is passed through to a first ultrafilter (u/f), where a u/f concentrate stream and a u/f permeate stream are produced. This step removes suspended solids with a size larger than about 0.1 microns. The u/f permeate stream is collected in a vessel, such as a feed tank, and the u/f concentrate stream is fed to the next (successive) ultrafilter in the series to filter out dissolved potato solids or particles having a size ranging from about 0.1 to about 0.0003 microns. This ultrafilter produces a u/f permeate stream that is routed to the feed tank and combined with the u/f permeate stream from the first ultrafilter. The u/f concentrate stream is fed to the next successive ultrafilter in the series and the process repeated for each ultrafilter. The number of ultrafilters in the series is defined by the concentration of solids desired, permeate production rate, and economic considerations. When the u/f concentrate is fed to the last ultrafilter in the series, a final u/f concentrate stream is produced and is introduced into at least one vessel in the manufacturing process, preferably the ricing or drying vessel. The collected u/f permeate stream may be reintroduced into an earlier stage in the manufacturing process, stored, or treated as waste water.

Figure 4:
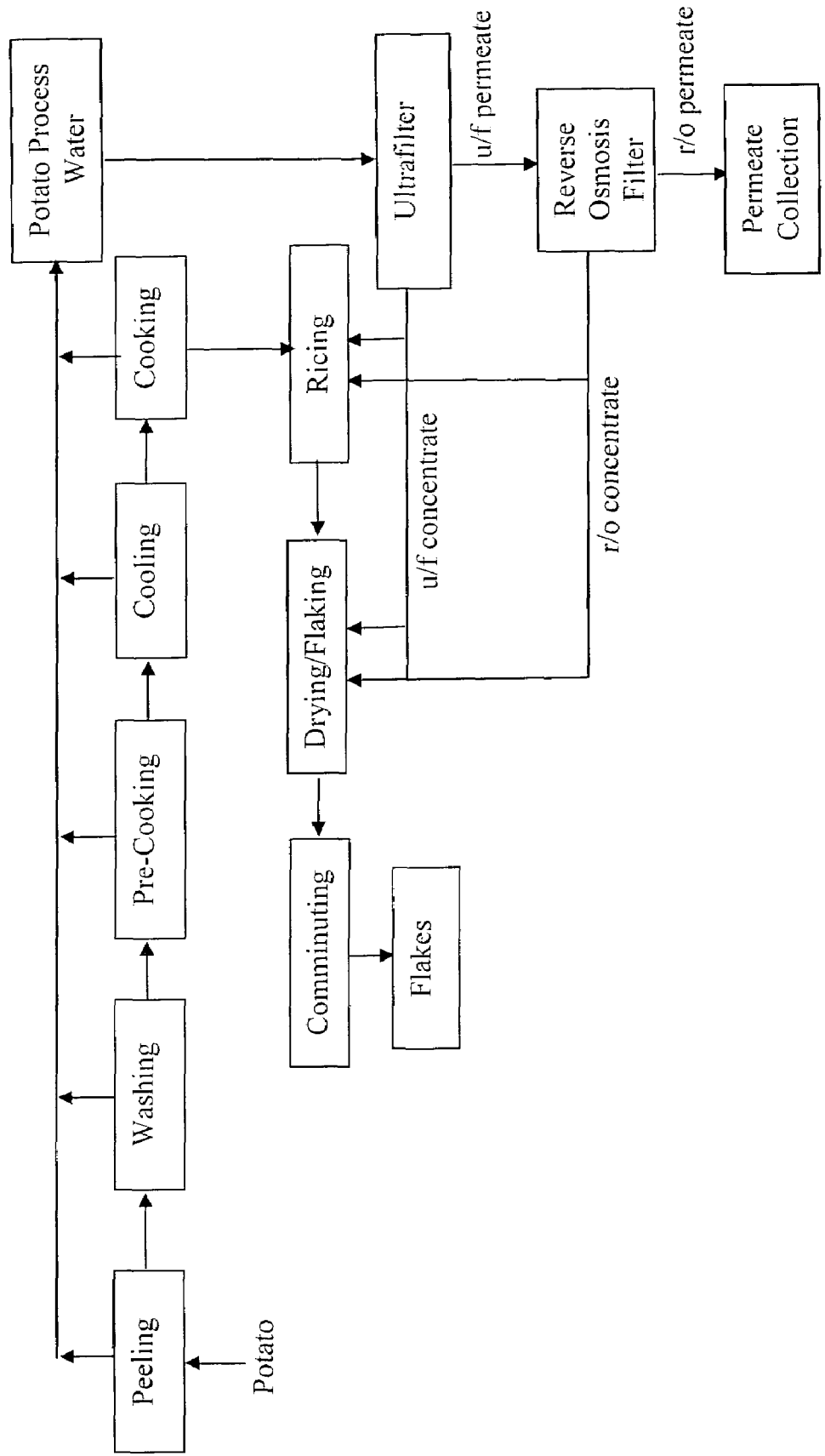
FIG. 4 is a schematic representation of the method of the present invention wherein an ultrafilter and a reverse osmosis filter are employed.

FIG. 4 depicts an embodiment of the invention where an ultrafilter is used in combination with a reverse osmosis filter. The membrane for the reverse osmosis filter is a high temperature membrane. Preferably, the membrane is a high-temperature organic membrane. Most preferably, the membrane is the Duratherm Excel™ Reverse Osmosis Membrane which is commercially available from Osmonics DESAL. In this embodiment, the potato process water having solids is passed through the ultrafilter (u/f) where a u/f concentrate stream and a u/f permeate stream are produced. The u/f permeate stream is then passed through a reverse osmosis (r/o) filter where a r/o permeate stream and a r/o concentrate stream are produced. The r/o concentrate stream is introduced into the ricing or drying steps of the manufacturing process. Similarly, the u/f concentrate stream is also introduced into the ricing or drying steps of the manufacturing process. The r/o permeate stream is collected and reintroduced into the manufacturing process.

Figure 5:
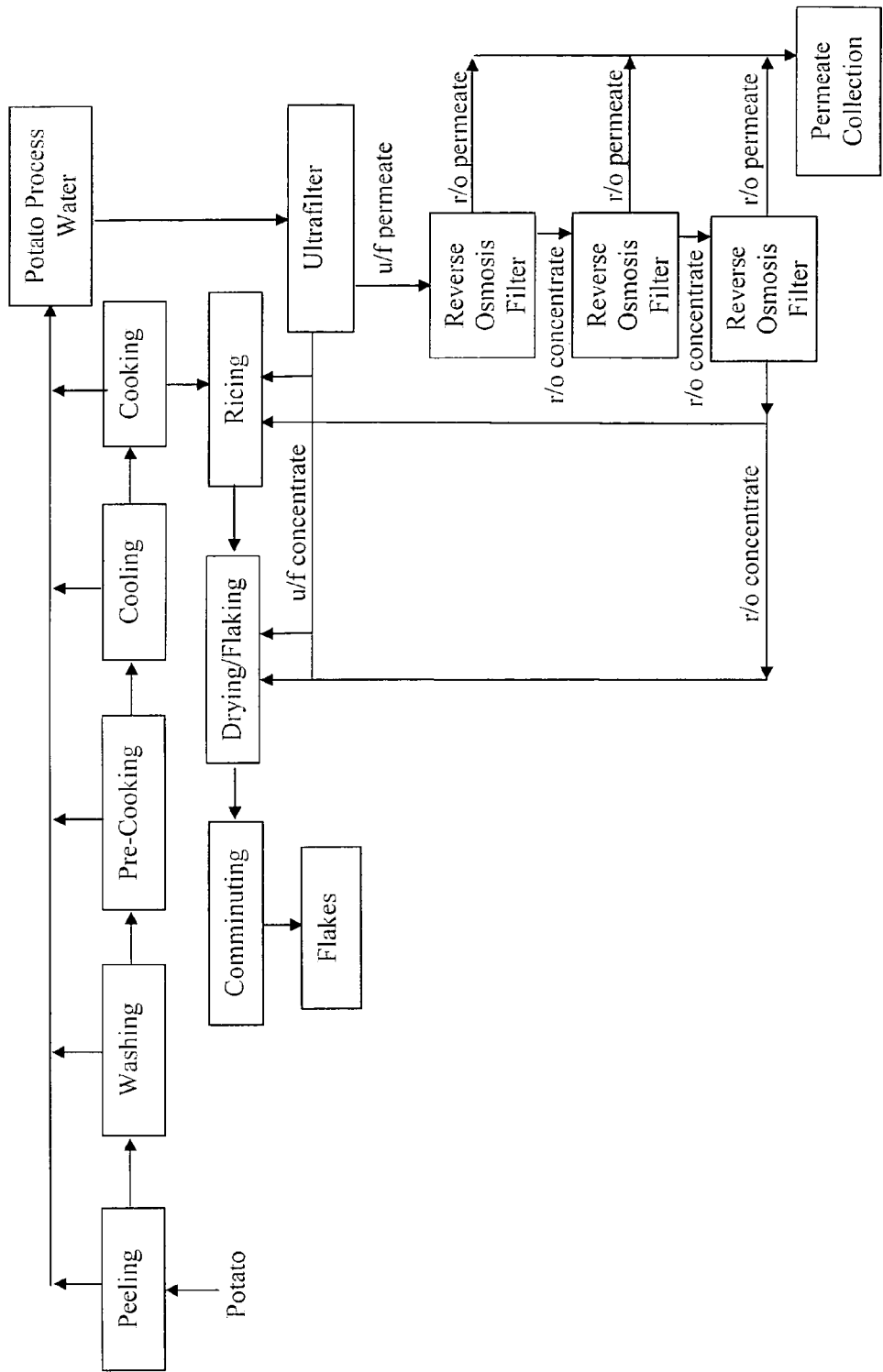
FIG. 5 is a schematic representation of the method of the present invention wherein an ultrafilter and a series of reverse osmosis filters are employed.

FIG. 5 depicts an alternate embodiment of the invention where a series of reverse osmosis filters are placed in combination with an ultrafilter. In this instance, the potato process water having solids is passed through the ultrafilter (u/f) where a u/f concentrate stream and a u/f permeate stream are produced. The u/f concentrate stream is introduced into the ricing or drying step of the manufacturing process and the u/f permeate stream is passed through a first reverse osmosis (r/o) filter in the series. This r/o filter produces a r/o permeate stream and a r/o concentrate stream. The r/o permeate stream is collected and the r/o concentrate stream is fed to a successive r/o filter in the series. This r/o filter produces a r/o permeate stream that is combined and collected with the first r/o permeate stream and the r/o concentrate stream is fed to the next r/o filter in the series. This process is repeated until the r/o concentrate stream is fed to the last r/o filter in the series. The final r/o concentrate stream is introduced into at least one vessel used for ricing or drying and the final r/o permeate stream is combined or collected with the other r/o permeate streams and reintroduced into the manufacturing process or treated as waste water. The r/o concentrate stream is either introduced into the ricing or drying vessels independently from the u/f concentrate stream or is combined with the u/f concentrate stream before it is introduced into the ricing or drying vessels.

Figure 6:
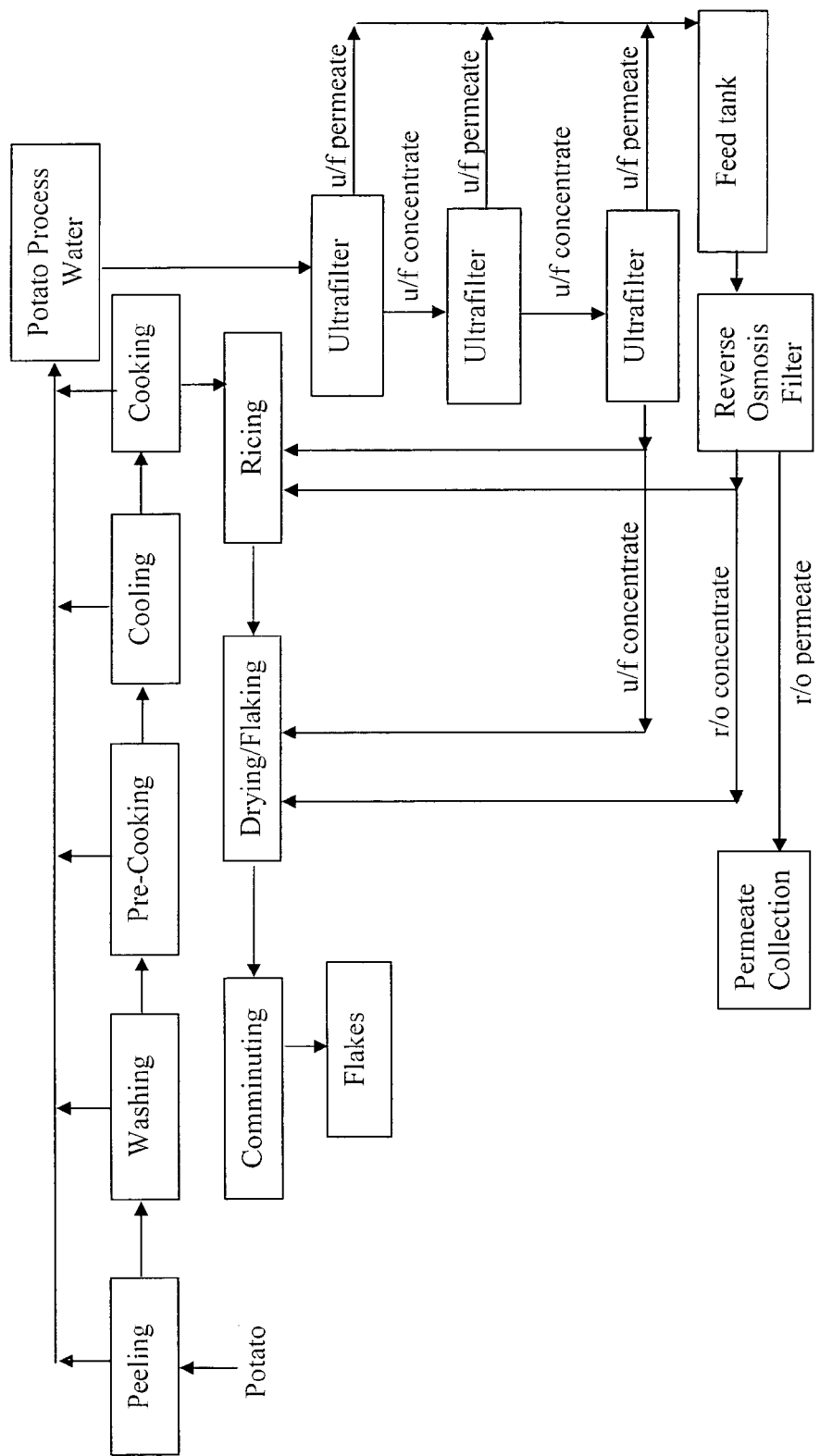
FIG. 6 is a schematic representation of the method of the present invention wherein a series of ultrafilters and a reverse osmosis filter are employed.

FIG. 6 depicts the method of the present invention where a series of ultrafilters are used in combination with a single reverse osmosis filter. In this embodiment, as discussed with respect to FIG. 3, the potato process water is passed through a series of ultrafilters. Each ultrafilter (u/f) produces a u/f concentrate stream and a u/f permeate stream. The u/f concentrate stream is passed to the next ultrafilter in the series increasing the concentration of potato solids with each pass. The final u/f concentrate stream is then introduced into at least one vessel used for either ricing or drying. However, the focus of this embodiment is on the u/f permeate stream. The u/f permeate stream from each ultrafilter is combined in a vessel such as a feed tank ad then introduced into the reverse osmosis (r/o) filter. The r/o filter produces a r/o concentrate stream that is introduced into at least one vessel used for ricing or drying or is first combined with the final u/f concentrate and introduced into the ricing or drying steps in the manufacturing process. The reverse osmosis filter also produces a r/o permeate stream that is collected and either reintroduced into the earlier stages of the manufacturing process or treated as waste water.

Figure 7:
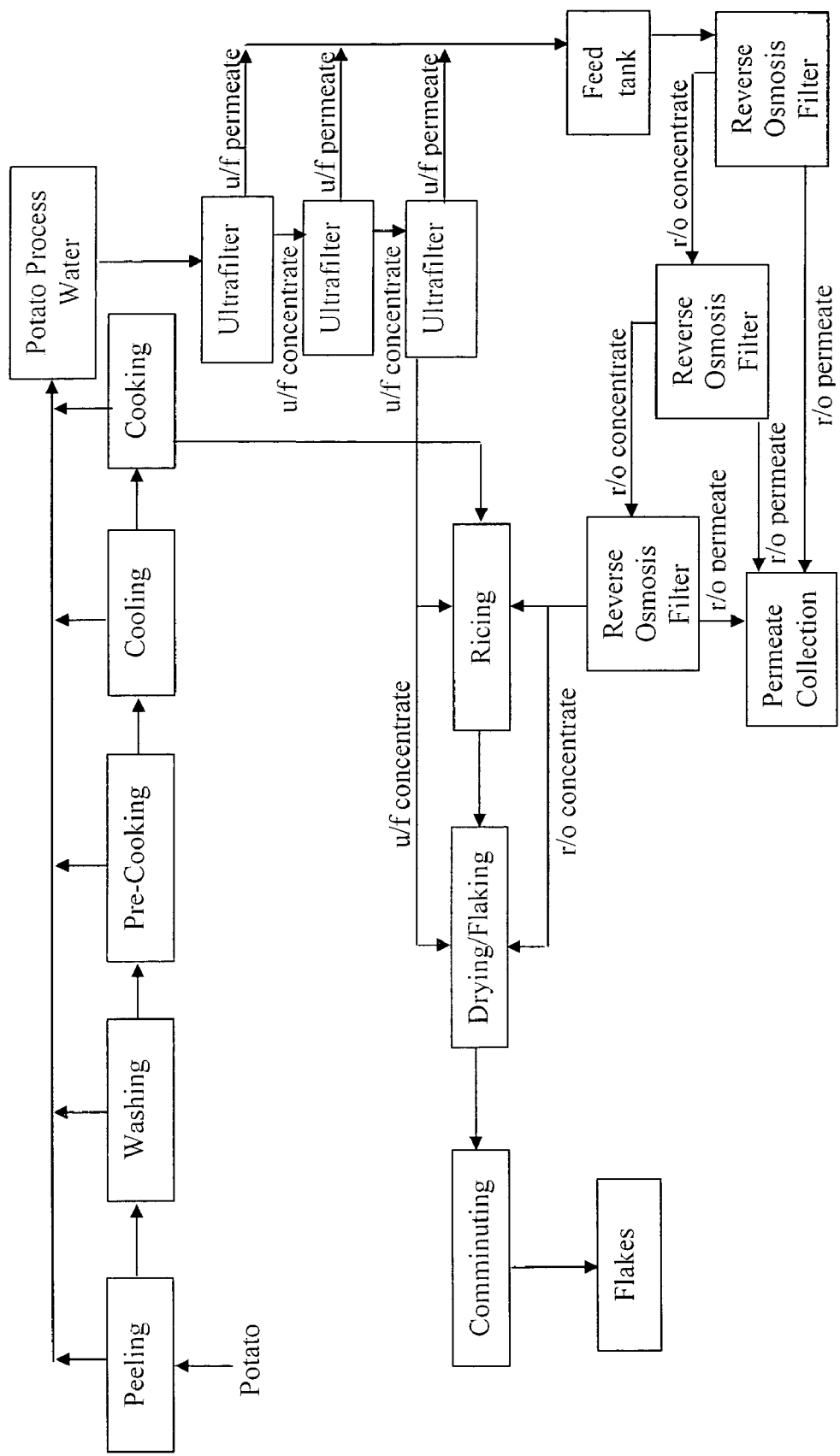
FIG. 7 is a schematic representation of the method of the present invention wherein a series of ultrafilters and a series of reverse osmosis filters are employed.

FIG. 7 depicts another embodiment of the invention where a series of ultrafilters and a series of reverse osmosis filters are employed. In this embodiment, the process water having solids is passed through a first ultrafilter (u/f) to produce a u/f permeate stream and a u/f concentrate stream. The u/f permeate stream is collected in a vessel and combined with the u/f permeate streams generated as each u/f concentrate stream is passed through the next ultrafilter in the series. Hence, each ultrafilter produces its own u/f concentrate and u/f permeate stream until a final u/f concentrate stream is produced. The final u/f concentrate stream is introduced into either a ricing or drying vessel. Each u/f permeate stream is combined with the u/f permeate streams from the other ultrafilters in the series and reserved for introduction into a series of reverse osmosis filters. The u/f permeate stream is introduced into a first reverse osmosis (r/o) filter which produces a r/o permeate stream and a r/o concentrate stream. The r/o concentrate stream is fed into the next reverse osmosis filter in the series and so forth such that each reverse osmosis filter produces a r/o concentrate stream and a r/o permeate stream. The r/o permeate streams from each reverse osmosis filter are collected and combined with each other for either reintroduction into the manufacturing process or treated as waste water. As each concentrate stream is passed through the next reverse osmosis filter in the series, the concentration of solids increases until a final r/o concentrate stream is produced. The final r/o concentrate stream is either directly introduced into a ricing or drying vessel or the r/o concentrate stream is combined with the u/f concentrate stream and then introduced into the ricing or drying vessel.

As yet another embodiment of the invention, processing additives are added into the potato process water containing solids before the process water is passed through at least one ultrafilter. Such processing additives increase the permeate production rate, decrease obstruction in the filtration equipment, and/or increase the attainable concentration. Any additive known to those of ordinary skill in the art that will achieve the desired result may be employed. Preferably, the processing additive is an enzyme. Enzymes are added for such purposes as degrading the starch or degrading the potato cell walls, as well as increasing the throughput. The enzyme additive may be used alone or in combination with other enzyme additives or other processing additives. Any suitable enzyme known in the art can be used such as protease enzymes and amylase enzymes. Preferably, an alpha-amylase enzyme, such as BAN enzymes commercially available from Novo Nordisk, is used as the enzyme in practicing the method of the present invention. Preferably, the enzyme is fully captured in the ultrafilter. The amount of enzyme added depends on the type of enzyme added, the throughput of the filtration process, the temperature, the pH, the amount of solids, the character of the solids, the type of filtration used, and the length of time that has lapsed since the filter was last cleaned. In general the enzyme is added at an amount ranging from about 0.08 ml to about 0.4 ml enzyme per pound of starch wherein the enzyme activity is at least 150 KNU-s/g. Most preferably, about 0.2 ml enzyme per pound of starch is used in the present invention. Although the enzyme may be added batch-wise, preferably the enzyme is added continuously.

Example

A two-stage ultrafilter system and two-stage reverse osmosis filter system was employed in practicing the method of the present invention. Potato process water containing solids was provided and a 20 mesh filter was used to prescreen the process water. A 0.1 micron ceramic ultrafilter manufactured by Graver Technologies was used in both stages of the ultrafiltration. Several tests were conducted to determine the operating parameters of the ultrafiltration system. The important test parameters and results are summarized in Table 1.

TABLE 1

| | Ultrafiltration (UF) System | | | | | | | |
|---|---|---|---|---|---|---|---|---|
| Test | Cross Flow (gpm) | Face Velocity (fps) | Trans-Membrane Pressure (psi) | Temperature UF 2 (° F.) | VRF UF 2 | Total Suspended Solids (%) | Total Solids (%) | Permeate Flux UF 2 (gfd) |
| 1 | 600 | 18 | 10 to 50 | 170 | 2 | No data | No Data | 30 to 85 |
| 2 | 300 | 9 | 30 | 165 | 2 | 4.8 | 6.4 | 10 |
| 3 | 300 | 9 | 35 | 140 | 10 | 5.4 | 7.2 | 20 to 10 |
| 4 | 100 | 3 | 35 | 170 | 30 | 17.3 | 18.9 | 15 |
| 5 | 540 | 18 | 32 | 175 | 10 | 5.4 | 8.1 | 71 |
| 6 | 530 | 16 | 33 | 180 | 13 | 8.4 | 10.9 | 39 |
| 7 | 390 | 12 | 24 | 180 | 18 | 10.8 | 14.1 | 28 |

TABLE 1-continued

Ultrafiltration (UF) System

| Test | Cross Flow (gpm) | Face Velocity (fps) | Trans-Membrane Pressure (psi) | Temperature UF 2 (° F.) | VRF UF 2 | Total Suspended Solids (%) | Total Solids (%) | Permeate Flux UF 2 (gfd) |
|---|---|---|---|---|---|---|---|---|
| 8 | 100 | 3 | 42 | 200 | 28 | 16.6 | 20.4 | 22 |
| 9 | 600 | 18 | 35 | 170 | 2 | 2.2 | 4.5 | 110 |
| 10 | 300 | 9 | 30 | 160 | No data | 1.5 | 4.1 | 79 |
| 11 | 300 | 9 | 37 | 180 | No data | 15.4 | 18.4 | 27 |

A two-stage, high temperature, sanitary reverse osmosis skid was obtained from Osmonics. The Osmonics skid was operated at high temperatures with no biological fouling occurring. Five tests were conducted to determine the operating parameters of the system. The important test parameters and results are summarized in Table 2. The last test was run for 24 hours. The permeate flux at the end of 24 hours was holding steady.

TABLE 2

Reverse Osmosis System (Sorted by Volume Reduction Factor (VRF))

| Test | VRF | Pressure (psi) | Temperature (° F.) | Measured Total Dissolved Solids (%) | Average Permeate Flux (gfd) | Calculated Average Total Dissolved Solids (%) |
|---|---|---|---|---|---|---|
| 4 | 4.3 | 260 | 160 | No data | 2.8 | 9.89 |
| 4 | 4.2 | 290 | 163 | 8 | 2.2 | 9.66 |
| 3 | 4.1 | 260 | 161 | 9.5 | 2.6 | 9.43 |
| 4 | 2.5 | 290 | 163 | No data | 8.7 | 5.75 |
| 4 | 2.4 | 260 | 160 | No data | 9.2 | 5.52 |
| 3 | 2.4 | 260 | 161 | No data | 8.8 | 5.52 |
| 2 | 2.6 | 210 | 164 | 5.4 | 5.8 | 5.98 |
| 1 | 2.2 | 210 | 167 | 4.7 | 9.9 | 5.06 |
| 5 | 2 | 210 | 166 | 4.8 | 10.3 | 4.6 |
| 2 | 1.9 | 210 | 164 | No data | 11.2 | 4.37 |
| 2 | 1.7 | 210 | 163 | No data | 12.1 | 3.91 |
| 1 | 1.5 | 210 | 167 | No data | 14.6 | 3.45 |
| 5 | 1.4 | 210 | 166 | No data | 15.2 | 3.22 |
| 2 | 1.4 | 210 | 163 | No data | 16 | 3.22 |

A test was performed to determine if concentrate from the two-stage ultrafiltration and two-stage reverse osmosis could be returned to a dehydrated flake process. The concentrate from the reverse osmosis system at a VRF of 2 and ultrafiltration system at a VRF of 25 were mixed and fed for 8 hours to a flake drum at a rate of about 0.65 gpm. The drum ran without incident and the product produced, a potato flour, was normal in all aspects.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. A method for filtering and recovering solids from potato process water, the method comprising the steps of:
   a) providing a plurality of vessels wherein a step in a manufacturing process takes place in each vessel and wherein at least one step in the manufacturing process produces a potato process water having solids;
   b) passing the potato process water through at least one ultrafilter wherein each ultrafilter produces a u/f permeate stream and a u/f concentrate stream; and
   c) collecting and reintroducing the u/f concentrate stream into at least one vessel used for either ricing or drying in the manufacturing process producing a product containing a portion of the solids from the potato process water and wherein the final characteristics of the product remain essentially unchanged.

2. A method according to claim 1, wherein the manufacturing process is selected from the group consisting of: peeling; washing; pre-cooking; cooling; cooking; ricing; and drying.

3. A method according to claim 2, wherein the process water having solids is produced by a manufacturing process selected from the group consisting of: peeling; washing; pre-cooking; cooling; and cooking.

4. A method according to claim 1, further comprising the step of passing the u/f permeate stream through at least one reverse osmosis filter wherein each reverse osmosis filter produces a r/o permeate stream and a r/o concentrate stream and wherein the r/o concentrate stream is introduced into at least one vessel used for either ricing or drying.

5. A method according to claim 4, wherein the r/o concentrate stream is combined with the u/f concentrate stream and introduced into at least one vessel used for either ricing or drying.

6. A method according to claim 1, wherein the potato process water is passed through a series of ultrafilters, each ultrafilter producing a u/f concentrate stream and a u/f permeate stream, wherein each u/f permeate stream is collected and wherein each u/f concentrate stream is fed to a successive ultrafilter in the series to form a final u/f concentrate stream and wherein the final u/f concentrate stream is introduced into said at least one vessel used for either ricing or drying.

7. A method according to claim 6, further comprising the step of passing the u/f permeate streams through at least one reverse osmosis filter wherein each reverse osmosis filter produces a r/o permeate stream and a r/o concentrate stream and wherein the r/o concentrate stream is introduced into said at least one vessel used for either ricing or drying.

8. A method according to claim 7, wherein the r/o concentrate stream is combined with the u/f concentrate stream and introduced into said at least one vessel used for either ricing or drying.

9. A method according to claim 1, further comprising the step of passing the u/f permeate stream through a series of reverse osmosis filters, each reverse osmosis filter producing a r/o permeate stream and a r/o concentrate stream, wherein each r/o permeate stream is collected and wherein each r/o concentrate stream is fed to a successive reverse osmosis filter in the series to form a final r/o concentrate stream and wherein the final r/o concentrate stream is introduced into said at least one vessel used for either ricing or drying.

10. A method according to claim 9, wherein the final r/o concentrate stream is combined with the u/f concentrate stream.

11. A method according to claim 1, wherein the potato process water is passed through a series of ultrafilters, each ultrafilter producing a u/f concentrate stream and a u/f permeate stream, wherein each u/f concentrate stream is fed to a successive ultrafilter in the series to form a final u/f concentrate stream and wherein each u/f permeate stream is collected and passed through a series of reverse osmosis filters, each reverse osmosis filter producing a r/o permeate stream and a r/o concentrate stream, wherein each r/o permeate stream is collected and wherein each r/o concentrate stream is fed to a successive reverse osmosis filter in the series to form a final r/o concentrate stream and wherein the final u/f concentrate stream and the final r/o concentrate stream are introduced into said at least one vessel used for either ricing or drying.

12. A method according to claim 11, wherein the final u/f concentrate stream and the final r/o concentrate stream are combined before introducing into said at least one vessel used for either ricing or drying.

13. A method according to claim 1, further comprising the step of introducing a processing additive into the potato process water before the potato process water is passed through at least one ultrafilter.

14. A method for filtering and recovering solids from potato process water, the method comprising the steps of:

a) providing a plurality of vessels wherein a step in a manufacturing process takes place in each vessel and wherein at least one step in the manufacturing process produces a potato process water having solids;
b) introducing an enzyme into the potato process water and passing the potato process water through at least one ultrafilter wherein each ultrafilter produces a u/f permeate stream and a u/f concentrate stream; and
c) collecting and reintroducing the u/f concentrate stream into at least one vessel in the manufacturing process producing a product containing a portion of the solids from the potato process water and wherein the final characteristics of the product remain essentially unchanged.

15. A method according to claim 14, wherein the enzyme is selected from the group consisting of: a protease enzyme and an amylase enzyme.

16. A method according to claim 15, wherein the enzyme is an alpha-amylase enzyme.

17. A method according to claim 16, wherein the enzyme is added at an amount ranging from about 0.08 ml to about 0.4 ml enzyme per pound of starch and wherein the enzyme activity is at least 150 KNU-s/g.

18. A method according to claim 17, wherein the enzyme is added at an amount of about 0.2 ml enzyme per pound of starch.

19. A method according to claim 14, wherein the enzyme is added continuously.

* * * * *